United States Patent Office 2,799,649
Patented July 16, 1957

2,799,649

METHOD FOR INHIBITING CORROSION

Joseph A. Caldwell and Melba L. Lytle, Houston, Tex., assignors, by mesne assignments, to Esso Research and Engineering Company, Elizabeth, N. J., a corporation of Delaware No Drawing. Application July 14, 1954,
Serial No. 443,427

20 Claims. (Cl. 252—8.55)

The present invention is directed to a method for inhibiting the corrosiveness to corrodible metal surfaces of corrosive fluids produced from subsurface formations. More particularly, the invention relates to a method for inhibiting the corrosivity of petroliferous well fluids containing carbon dioxide or hydrogen sulfide brines to corrodible metal conduits and attendant equipment through which the fluids are flowed and processed.

In many oil fields and gas-condensate fields the production of fluids from subsurface formations is accompanied by extremely severe corrosion of the conduits and attendant equipment which is contacted by the fluid mixture being produced. In some instances it is found that the fluid mixture contains substantial amounts of carbon dioxide, a portion of which dissolves in the water present in the fluid mixture to form carbonic acid. In other cases it is found that the fluid includes sulfide brine which may contain alkali metal sulfides, alkaline earth metal sulfides, acid sulfides such as hydrogen sulfides, and/or organic sulfides. Those brines containing hydrogen sulfide are especially corrosive to iron and steel equipment, the hydrogen sulfide attacking the metal to form iron sulfide. Since these corrosive metals occur in or are introduced into the fluids originating in the subsurface formations, corrosion may occur throughout the conduits and attendant equipment through which the fluids are flowed and produced. In other instances the corrosion may be more or less localized to a limited portion or portions of the conduits through which the fluids are produced. Corrosion, whether intensive or extensive, if permitted to continue unabated, will damage conduits and attendant equipment through which the corrosive fluid is flowed and may damage this equipment to such an extent as to require replacement. Such replacements can be, and often are, extremely expensive. The expense involved is not limited merely to the cost of replacing the corroded equipment but may also involve killing the well in order to make necessary repairs and to replace the corroded equipment. Even more important than the high cost incurred as a result of corrosion is the danger that a well will flow wild as a result of the failure of the conduit or attendant equipment due to corrosion. Enormous losses may be incurred in such an eventuality.

The main object of the present invention is to provide a method of substantially eliminating or inhibiting corrosion of corrodible ferrous metal surfaces by corrosive well fluids.

In accordance with the present invention the corrosion to corrodible ferrous metal surfaces by corrosive petroliferous well fluids including brine, carbon dioxide or sulfides is eliminated or substantially reduced by introducing or incorporating in the corrosive well fluids a corrosion inhibiting amount of a polyalkylene glycol having a molecular weight in the range between about 200 and about 2000.

The polyalkylene glycol, as stated, for example, polyethylene glycols, may have a molecular weight in the range between about 200 and about 2000, with most effective results being obtained with polyethylene glycols having molecular weights in the range between about 300 and about 1500. Polyethylene glycols having molecular weights less than about 200 and above about 2000 are not satisfactory inhibitors.

Other examples of the polyalkylene glycols are: polypropylene glycols, condensation products of polypropylene glycols and ethylene oxide, and the like.

The polyalkylene glycols, for example, polyethylene glycols, may be added to or introduced into the corrosive well fluids in amounts in the range between about 0.01% to about 0.2% by volume with a preferred range being from about 0.01% to about 0.1% by volume.

The corrosive fluids while including carbon dioxide, hydrogen sulfide, acetic acid, propionic acid, and other organic acids, as well as the inorganic sulfides, salts, and the like, may also include the mineral acids such as sulfuric acid and hydrochloric acid, and the like. Aqueous mineral acids which are highly corrosive to ferrous metal surfaces may be suitably inhibited by adding thereto a corrosion inhibiting amount of polyethylene glycol of the type mentioned before.

In employing the corrosion inhibitors in the method of the present invention, the corrosion inhibitor may be introduced into the corrosive fluid and allowed to come into contact with the ferrous metal surface which is exposed to attack by the corrosive fluid.

When polyethylene glycol is employed to protect ferrous metal well equipment from attack by corrosive well fluids the polyethylene glycol may suitably be introduced into the annulus between the casing and the tubing and thence introduced into the tubing adjacent the lower end thereof as the corrosive well fluid is produced up the tubing. It is also contemplated in the practice of the present invention that polyethylene glycol may be introduced into an injection well, removed from the well from which the corrosive fluid is introduced, and polyethylene glycol admixed with the corrosive well fluid in the hydrocarbon reservoir adjacent the well from which the corrosive fluid is being produced.

It is also contemplated that polyethylene glycol may be used in the so-called permanent well completion technique to protect exposed surfaces of ferrous metal casing below the open end of a tubing string permanently located in the casing above the uppermost of a series of hydrocarbon productive intervals. The polyethylene glycol may be suitably introduced from the annulus in such a well and directed downwardly from the lower open end of the tubing in the casing and then caused to flow upwardly through the tubing string by increasing the effective length of the tubing utilizing a tubular member to extend from the open end of the tubing to the point where the corrosive fluid enters the casing through perforations.

It is contemplated in the practice of the present invention that polyethylene glycol may also suitably be introduced into the wellhead equipment as the hydrocarbons are produced to protect flow lines and lease tanks and the like which are exposed to the corrosive well fluids.

The corrosive well fluids may suitably comprise both light and heavy hydrocarbons such as condensate, including normally gaseous hydrocarbons and gasoline components, as well as crude oils which contain brine saturated with hydrogen sulfide and carbon dioxide. Likewise the present invention is directed to reducing the corrosiveness of aqueous solutions of mineral acids such as sulfuric acid and hydrochloric acid exposed to corrodible ferrous metal such as utilized in petroleum refining operations, and the like.

The present invention will be further illustrated by the following examples:

EXAMPLE I

Polyethylene glycol having a molecular weight in the range between about 570 and 630 was employed to inhibit the corrosiveness of oil brine and hydrogen sulfide mixture. The oil was West Texas crude to which had been added 0.1% by volume of the polyethylene glycol, as stated. The polyethylene glycol was added to a 50:50 mixture of West Texas crude oil and West Texas brine and the mixture was saturated with hydrogen sulfide. Mild carbon steel coupons were immersed 31 times a minute for a period of 14 days in a blank without inhibitor and in the mixture containing the polyethylene glycol. The extent of the corrosion inhibition obtained was compared with the results obtained from the coupons immersed in the corrosive mixture not containing the polyethylene glycol and exposed to identical conditions.

Additional determinations of the effectiveness of polyethylene glycols having molecular weights ranging from 380 to about 2000 were conducted with the same corrosive mixture of West Texas oil and brine which was also saturated with hydrogen sulfide. As before, mild steel coupons were exposed to the corrosive mixture by immersing same in the corrosive medium 31 times a minute for a period of 14 days. The results of the several operations are presented in Table I which sets out the identity of the polyethylene glycol, molecular weight, concentration, the corrosion rate in inches per year, and finally the percent reduction.

of hydrogen sulfide oil and brine mixtures to steel surfaces.

It is to be noted that the Pluronic L44 at the lowest concentration, namely the lower limit of the range of concentrations, 0.01% by volume, gave only 13% reduction over the blank indicating, for this compound, that concentrations in the range given should be used and further the molecular weight should not exceed about 2000.

EXAMPLE II

Additional determinations were made with 5% aqueous solution of sulfuric and hydrochloric acid to determine the effectiveness of polyethylene glycol in inhibiting the corrosiveness of these acids to ferrous metal surfaces. In addition, a determination was made on inhibiting the corrosiveness of a condensate from the Katy Field in Harris County, Texas, which contained propionic acid and carbon dioxide.

In this series of tests mild steel coupons were immersed in the condensate for varying periods of time with the coupons being exposed to the corrosive condensate 31 times a minute over a peirod of time set out in Table II. The method of test used with the condensate is described in detail in U. S. 2,614,983, issued to Joseph A. Caldwell and Melba L. Lytle. With respect to the operations with aqueous sulfuric and hydrochloric acid the coupons were not removed from the corrosive fluid during the test period. In short with the mineral acids, static determinations were made at temperatures of 77° and 164° F.

*Table I*

$H_2S$—WEST TEXAS OIL AND BRINE

| Compound | Molecular Wts. (Avg. or Approx.) | Conc. of Compound | Corrosion Rate: (In./Yr.) | | Percent Reduction Over Blank |
|---|---|---|---|---|---|
| | | | With Inhibitor | Without Inhibitor | |
| Polyethylene Glycol 400 | 380–420 | 0.1 Vol. percent | 0.0035 | 0.0058 | 40 |
| Polyethylene Glycol | 500–600 | 0.1 Wt. percent (1 coupon) | 0.0071 | 0.0286 | 76 |
| Polyethylene Glycol 600 | 570–630 | 0.1 Vol. percent | 0.0002 | 0.0140 | 98 |
| Do | | 0.05 Vol. percent | 0.0017 | 0.0303 | 95 |
| Do | | 0.01 Vol. percent | 0.0085 | 0.0264 | 68 |
| Polyethylene Glycol 1000 | 950–1,050 | 0.1 Wt. percent | 0.0052 | 0.0254 | 80 |
| Do | | 0.01 Wt. percent | 0.0160 | 0.0242 | 34 |
| Polypropylene Glycol 425 | 400–450 | 0.1 Vol. percent | 0.0097 | 0.0255 | 62 |
| Pluronic L31 | | 0.1 Vol. percent | 0.0039 | 0.0286 | 86 |
| Pluronic L44 | 2,000 | 0.1 Vol. percent | 0.0001 | 0.0240 | 99 |
| Do | 2,000 | 0.01 Vol. percent | 0.0220 | 0.0254 | 13 |

Pluronic is a trade name for non-ionic surface-active agents prepared by condensing ethylene oxide on a polyoxy-propylene polymer. The Pluronics had the following compositions: L31—80–90% polyoxypropylene glycol (M. W.: 801–1,000); 10–20% ethylene oxide. L44—50–60% polyoxypropylene glycol (M. W.: 1,001–1,200); 40–50% ethylene oxide.

*Table II*

| Compound | Conc. of Compound, Vol. Percent | Duration of Test | Corrosive Medium | Temp., °F. | Corrosion Rate: (In./Yr.) | | Percent Reduction Over Blank |
|---|---|---|---|---|---|---|---|
| | | | | | With Inhibitor | Without Inhibitor | |
| Polyethylene Glycol 600 | 0.1 | 14 Hrs | 5% $H_2SO_4$ | 164 | 0.0347 | 0.1599 | 78 |
| Do | 0.01 | do | do | 164 | 0.0438 | 0.1599 | 72 |
| Pluronic L44 | 0.1 | do | do | 164 | 0.0436 | 0.1599 | 72 |
| Polyethylene Glycol 600 | 0.1 | do | do | 77 | 0.0021 | 0.0052 | 60 |
| Do | 0.05 | do | 5% HCl | 164 | 0.1306 | 0.6259 | 79 |
| Do | 0.02 | do | do | 164 | 0.1823 | 0.6259 | 70 |
| Do | 0.01 | do | do | 164 | 0.1424 | 0.6259 | 76 |
| Do | 0.01 | do | do | 77 | 0.0018 | 0.0054 | 67 |
| Do | 0.1 | 14 Days | (1) | 77 | 0.0059 | 0.0091 | 35 |

[1] 0.1% propionic acid, 50–50 Katy condensate-water, and $CO_2$.

From the foregoing data presented in Table I it will be clear that the polyethylene glycols of varying molecular weight are effective in inhibiting the corrosiveness From the results shown in Table II it is apparent that polyethylene glycols are effective corrosion inhibitors for aqueous sulfuric and hydrochloric acids and also reduce the corrosiveness of hydrocarbon condensate from the Katy Field which contained propionic acid, water, and carbon dioxide.

Thus, in accordance with our invention the polyethylene glycols are effective corrosion inhibitors in both strong and weak mineral acids as well as in the organic acids.

The present invention has considerable utility and advantage in the oil industry and wherever corrosive fluids are exposed to ferrous metal surfaces which are corrodible thereby. Thus, the polyethylene glycols are inexpensive and readily available, are also easily handled and require inexpensive equipment for introducing them into the corrosive medium. The polyethylene glycols are not objectionable to personnel handling them and are effective corrosion inhibitors and, therefore, have wide utility.

The nature and objects of the present invention having been completely described and illustrated, what we wish to claim as new and useful and to secure by Letters Patent is:

1. A method for reducing the corrosiveness to corrodible ferrous metal of a corrosive fluid including moisture and an acid component in contact with said metal which comprises introducing into said fluid a corrosion-inhibiting amount of a polyalkylene glycol having a molecular weight in the range between about 200 and about 2000.

2. A method in accordance with claim 1 in which the polyalkylene glycol is polyethylene glycol.

3. A method in accordance with claim 1 in which the polyalkylene glycol is prepared by condensing ethylene oxide on a polyoxypropylene polymer.

4. A method in accordance with claim 1 in which the corrosion-inhibiting amount is in the range between 0.01% to 0.2% by volume of the corrosive fluid.

5. A method in accordance with claim 1 in which the corrosive fluid is a well fluid.

6. A method in accordance with claim 1 in which the acid component is a mineral acid.

7. A method in accordance with claim 1 in which the acid component is an organic acid.

8. A method for reducing the corrosiveness of a corrosive petroliferous well fluid including moisture and an acid component to corrodible ferrous metal well equipment in contact with said corrosive fluid which comprises adding to said corrosive fluid a corrosion-inhibiting amount in the range between 0.1% and 0.2% by volume of a polyalkylene glycol having a molecular weight in the range between about 200 and about 2000.

9. A method in accordance with claim 8 in which the corrosion-inhibiting amount is in the range between 0.01% and 0.1% by volume.

10. A method in accordance with claim 8 in which the molecular weight is in the range between about 300 and about 1500.

11. A method in accordance with claim 8 in which the polyalkylene glycol is a polyethylene glycol and is added to the corrosive well fluid as it is being produced.

12. A method in accordance with claim 8 in which the polyalkylene glycol is prepared by condensing ethylene oxide on a polyoxypropylene polymer.

13. A method in accordance with claim 8 in which the acid component is hydrogen sulfide.

14. A method in accordance with claim 8 in which the acid component is carbon dioxide.

15. A method in accordance with claim 8 in which the acid component is sulfuric acid.

16. A method in accordance with claim 8 in which the acid component is hydrochloric acid.

17. A method in accordance with claim 8 in which the acid component is propionic acid.

18. A method for reducing the corrosiveness of a corrosive petroliferous well fluid including moisture and hydrogen sulfide to corrodible ferrous metal well equipment in contact with said corrosive fluid which comprises adding to said corrosive fluid a corrosion-inhibiting amount in the range between 0.01% and 0.2% by volume of a polyalkylene glycol having a molecular weight in the range between about 200 and about 2000, and then flowing said corrosive fluid containing said added polyalkylene glycol through said well equipment.

19. A method in accordance with claim 18 in which the polyalkylene glycol is polyethylene glycol.

20. A method in accordance with claim 18 in which the polyalkylene glycol is prepared by condensing ethylene oxide on a polyoxy propylene polymer.

References Cited in the file of this patent

UNITED STATES PATENTS

| | | |
|---|---|---|
| 2,531,829 | Seymour | Nov. 28, 1950 |
| 2,564,759 | Haggard | Aug. 21, 1951 |
| 2,614,982 | Caldwell et al. | Oct. 21, 1952 |
| 2,614,983 | Caldwell et al. | Oct. 21, 1952 |
| 2,630,380 | Hanson et al. | Mar. 3, 1953 |
| 2,649,415 | Sundberg et al. | Aug. 18, 1953 |